(12) United States Patent
Blattmann et al.

(10) Patent No.: US 10,397,057 B2
(45) Date of Patent: Aug. 27, 2019

(54) TRANSMITTING DIGITAL DATA IN TWO-WIRE COMMUNICATION NETWORKS

(71) Applicant: Siemens Schweiz AG, Zurich (CH)

(72) Inventors: Bernhard Blattmann, Winterthur (CH); Oskar Camenzind, Steinen (CH); Juerg Eggerschwiler, Stans (CH); Roland Kueng, Wolfhausen (CH)

(73) Assignee: SIEMENS SCHWEIZ AG, Zurich (CH)

(*) Notice: Subject to any disclaimer, the term of this patent is extended or adjusted under 35 U.S.C. 154(b) by 100 days.

(21) Appl. No.: 15/524,553

(22) PCT Filed: Oct. 22, 2015

(86) PCT No.: PCT/EP2015/074429
§ 371 (c)(1),
(2) Date: May 4, 2017

(87) PCT Pub. No.: WO2016/071115
PCT Pub. Date: May 12, 2016

(65) Prior Publication Data
US 2017/0324610 A1    Nov. 9, 2017

(30) Foreign Application Priority Data

Nov. 6, 2014   (DE) .................. 10 2014 222 661

(51) Int. Cl.
*H04L 12/24*    (2006.01)
*H04L 12/40*    (2006.01)
(Continued)

(52) U.S. Cl.
CPC .......... *H04L 41/083* (2013.01); *H04L 1/0002* (2013.01); *H04L 12/40032* (2013.01);
(Continued)

(58) Field of Classification Search
CPC ............. H04L 41/083; H04L 17/40032; H04L 12/40136; H04L 41/12; H04L 43/0888
(Continued)

(56) References Cited

U.S. PATENT DOCUMENTS

2001/0049761 A1* 12/2001 Huang ................... H04B 3/542
                                                                710/305
2003/0161424 A1*  8/2003 Varela ................ H04B 7/18513
                                                                375/350
(Continued)

FOREIGN PATENT DOCUMENTS

EP          2372564 A1    10/2011    ............ G06F 13/40
GB          2323756 A      9/1998    ............. G06F 3/00
(Continued)

OTHER PUBLICATIONS

German Office Action, Application No. 102014222661.9, 9 pages, dated Oct. 9, 2015.
(Continued)

*Primary Examiner* — Sai Ming Chan

(74) *Attorney, Agent, or Firm* — Slayden Grubert Beard PLLC

(57) ABSTRACT

The present disclosure relates to communication networks. Some embodiments may include a communication network with two or more network nodes each comprising: a receiver discerning the signal quality of received signals; a transmitter sending signals at different data rates; and a controllable terminating impedance. A network node transmits the discerned signal quality to one or more additional network nodes, a network node records the signal qualities and corresponding values of the terminating impedances of the respective network nodes. A network node prescribes for additional network nodes a new respective value to set as a terminating impedance. A network node determines new terminating impedance values to optimize the data rate between the various network nodes and the signal quality at each of the network nodes.

20 Claims, 8 Drawing Sheets

(51) Int. Cl.
*H04L 12/26* (2006.01)
*H04L 1/00* (2006.01)
(52) U.S. Cl.
CPC ........ *H04L 12/40136* (2013.01); *H04L 41/12* (2013.01); *H04L 43/0888* (2013.01); *Y02D 50/10* (2018.01)
(58) Field of Classification Search
USPC ........................................................ 370/252
See application file for complete search history.

(56) References Cited

U.S. PATENT DOCUMENTS

| | | | |
|---|---|---|---|
| 2004/0124996 A1 | 7/2004 | Andersen | 340/870.38 |
| 2005/0264316 A1 | 12/2005 | Atkinson | 326/30 |
| 2006/0025872 A1 | 2/2006 | Glanzer et al. | 700/21 |
| 2008/0076353 A1 | 3/2008 | Rofougaran et al. | 455/41.2 |
| 2010/0030934 A1 | 2/2010 | Bruennert et al. | 710/104 |
| 2012/0254475 A1 | 10/2012 | Voss et al. | 710/9 |
| 2014/0269860 A1* | 9/2014 | Brown | H04B 3/54 375/219 |

FOREIGN PATENT DOCUMENTS

| | | | | |
|---|---|---|---|---|
| WO | 2010/032214 A2 | 3/2010 | ............ | H04B 10/08 |
| WO | 2016/071115 A1 | 5/2016 | ............ | H04L 12/40 |

OTHER PUBLICATIONS

International Search Report and Written Opinion, Application No. PCT/EP2015/074429, 9 pages, dated Jan. 28, 2016.

\* cited by examiner

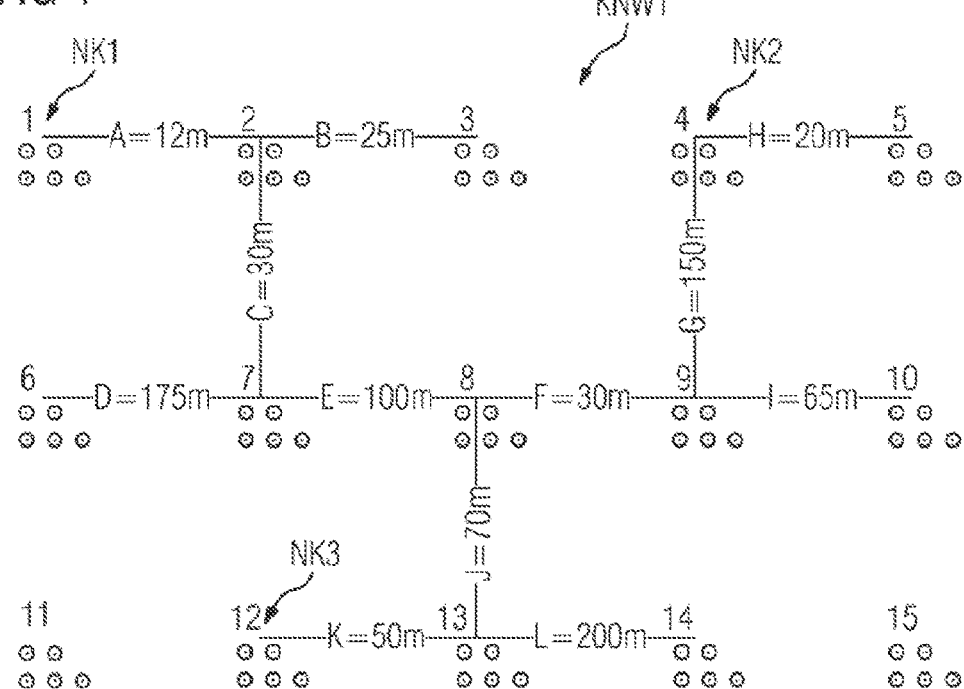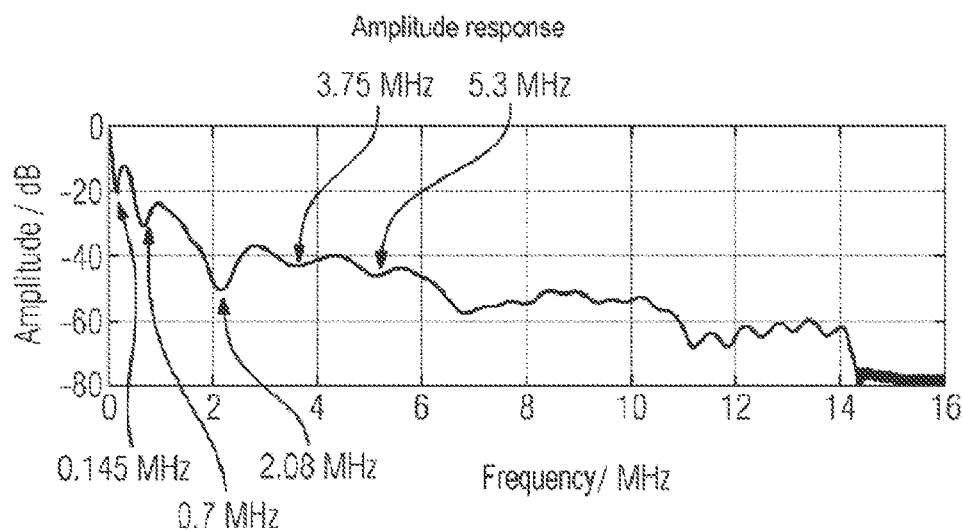

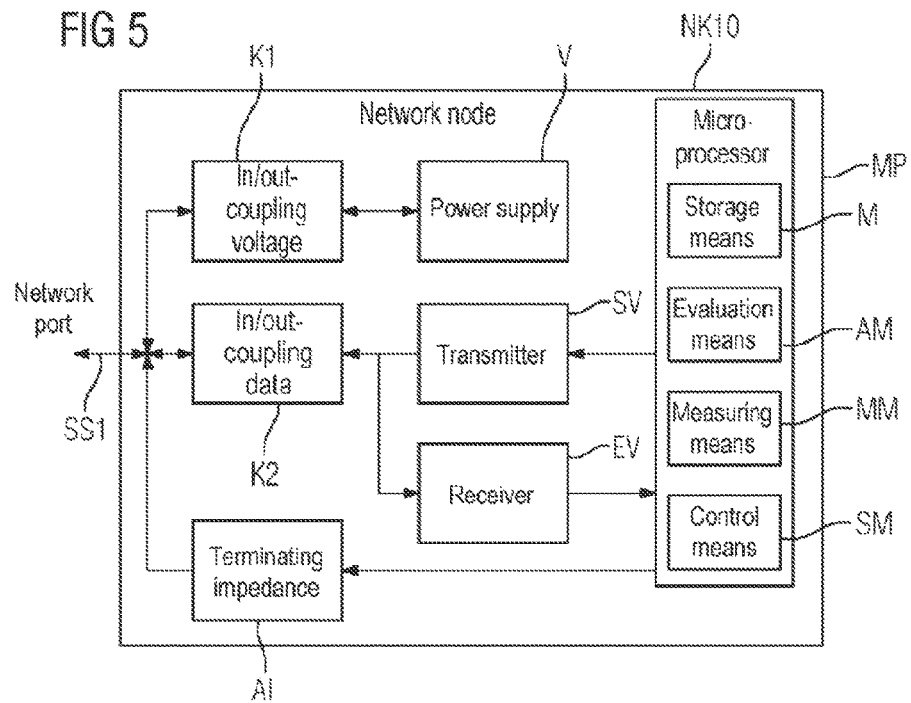
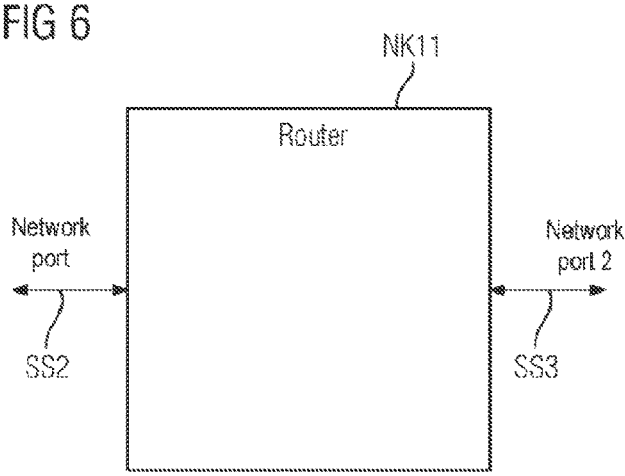

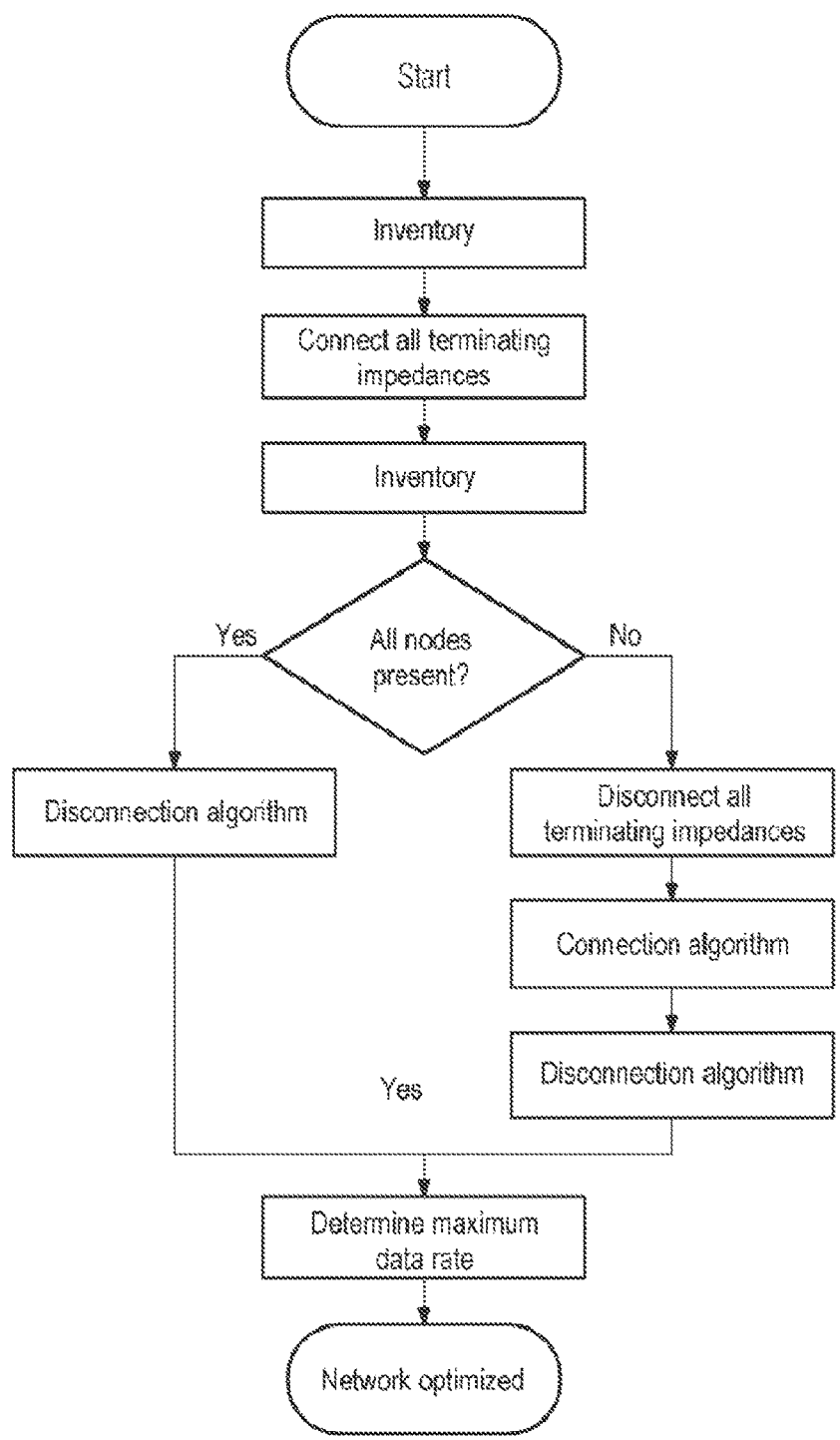

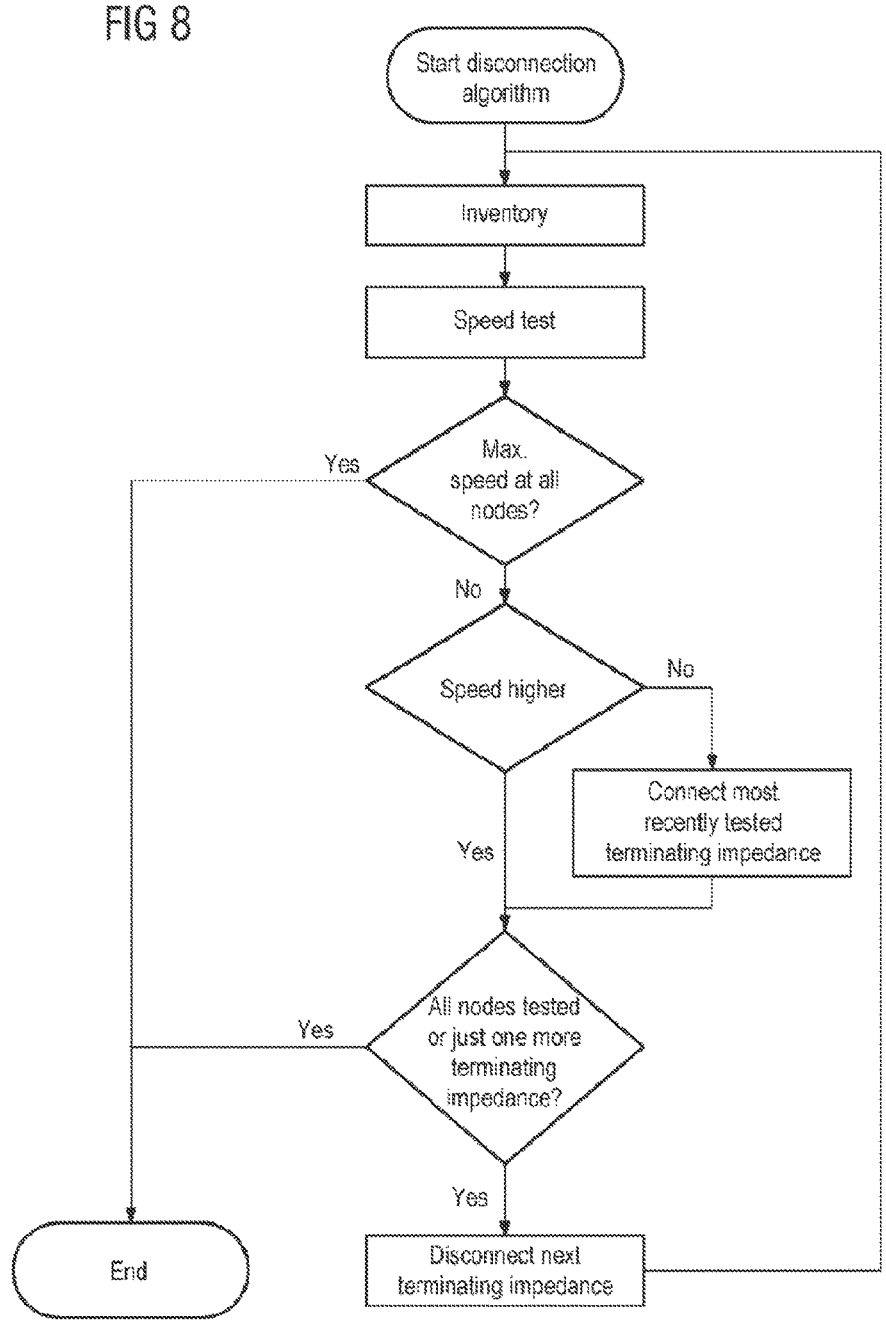

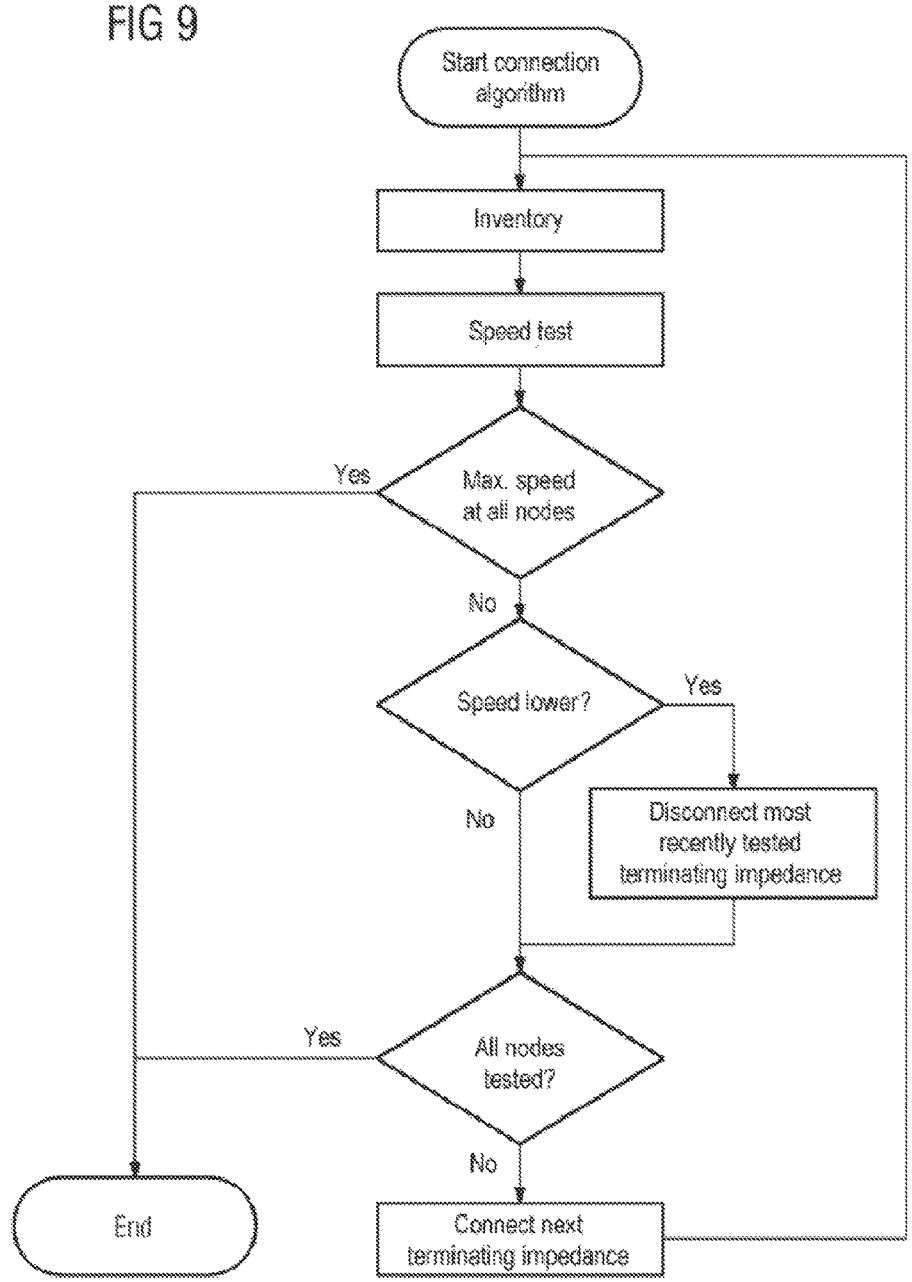

FIG 10

| | Tx1 | Tx2 | Tx3 | Tx4 | Tx5 | Tx6 | Tx7 | Tx8 | Tx9 | Tx10 | Tx11 | Tx12 | Tx13 | Tx14 | Tx15 | Tx16 |
|---|---|---|---|---|---|---|---|---|---|---|---|---|---|---|---|---|
| Rx1 | 1250 | 1250 | 1250 | 1000 | 1000 | 1250 | 1250 | 1250 | 1250 | 1250 | 1250 | 1250 | 1250 | 1000 | 1000 | 1250 |
| Rx2 | 1250 | 1250 | 1250 | 1000 | 1000 | 1250 | 1250 | 1250 | 1250 | 1250 | 1250 | 1250 | 1250 | 500 | 500 | 1250 |
| Rx3 | 1250 | 1250 | 1250 | 1000 | 1000 | 1250 | 1000 | 1250 | 1250 | 1250 | 1250 | 1250 | 1250 | 500 | 500 | 1250 |
| Rx4 | 500 | 500 | 500 | 1000 | 1250 | 500 | 1000 | 1250 | 1250 | 1250 | 1250 | 1250 | 500 | 500 | 500 | 1250 |
| Rx5 | 1000 | 1000 | 500 | 1000 | 1250 | 1250 | 1000 | 1250 | 1000 | 1250 | 500 | 500 | 1250 | 500 | 500 | 1250 |
| Rx6 | 1250 | 1250 | 1250 | 1000 | 500 | 1000 | 1250 | 1250 | 1250 | 1250 | 500 | 500 | 500 | 500 | 500 | 1250 |
| Rx7 | 1250 | 1250 | 1250 | 1000 | 1000 | 500 | 500 | 1250 | 1250 | 1250 | 1250 | 500 | 1250 | 500 | 500 | 1250 |
| Rx8 | 1250 | 1250 | 1250 | 1000 | 1250 | 1250 | 1250 | 1250 | 1250 | 1250 | 1250 | 1250 | 1250 | 500 | 500 | 1250 |
| Rx9 | 1250 | 1250 | 1250 | 1000 | 1250 | 1250 | 1250 | 1250 | 1000 | 1250 | 500 | 1250 | 1250 | 500 | 500 | 1250 |
| Rx10 | 1250 | 1250 | 1250 | 1000 | 500 | 1250 | 1250 | 1250 | 1250 | 1250 | 1000 | 1250 | 1250 | 500 | 1250 | 1250 |
| Rx11 | 1250 | 1250 | 1250 | 500 | 500 | 1250 | 1250 | 1250 | 1250 | 500 | 500 | 500 | 1250 | 500 | 500 | 1250 |
| Rx12 | 1250 | 1250 | 1250 | 500 | 500 | 1000 | 500 | 1250 | 500 | 500 | 500 | 500 | 1250 | 1250 | 1250 | 1250 |
| Rx13 | 1250 | 1250 | 1250 | 500 | 500 | 500 | 1250 | 1250 | 500 | 500 | 500 | 500 | 1250 | 1250 | 1250 | 1250 |
| Rx14 | 500 | 500 | 500 | 500 | 500 | 500 | 1000 | 1250 | 500 | 500 | 500 | 500 | 1250 | 1250 | 1250 | 500 |
| Rx15 | 500 | 500 | 500 | 1000 | 500 | 500 | 500 | 1250 | 1000 | 500 | 500 | 500 | 1250 | 500 | 500 | 500 |
| Rx16 | 1250 | 1250 | 1250 | 1000 | 1000 | 1250 | 500 | 1250 | 1250 | 1250 | 1250 | 1250 | 1250 | 500 | 500 | 1250 |

TRANSMITTING DIGITAL DATA IN TWO-WIRE COMMUNICATION NETWORKS

CROSS-REFERENCE TO RELATED APPLICATIONS

This application is a U.S. National Stage Application of International Application No. PCT/EP2015/074429 filed Oct. 22, 2015, which designates the United States of America, and claims priority to DE Application No. 10 2014 222 661.9 filed Nov. 6, 2014, the contents of which are hereby incorporated by reference in their entirety.

TECHNICAL FIELD

The present disclosure relates to communication networks. Some embodiments may have two or more network nodes and two-wire connections and may include a method for optimizing the transmission of digital data.

BACKGROUND

Communication networks with two-wire connections (twisted pair cables) are widespread and are also used in building automation for connecting actuators and sensors in a building. In the case of the standardized bus system KNX Twisted Pair (KNX TP), a bus line supplies bus subscribers with data and also with the required operating voltage. Communication networks having two-wire connections are used at field level in automation, control and regulatory, reading, measuring or operator control, and information systems.

In various applications, inexpensive communication networks (field buses) having complex tree structures and great extent, to which many network nodes (e.g. field devices) can be connected, are needed at the field level. For the cabling, simple inexpensive two-wire lines that require no active components at the junctions are usually used. The frequency response of such two-wire lines shows a distinct increase in the damping on the basis of the line lengths and the frequency. The damping produces a decrease in the signal level and hence in the transmission quality in the communication network. Therefore, known field buses (e.g. KNX TP (Twisted Pair)) can be operated only at low data rates (typically 10 kbit/s for a network extent in the region of 1000 m).

Manually setting terminating impedances to reduce the damping and reflections for the network nodes requires a high level of planning and commissioning complexity and is prone to error. The Japanese patent application JP2006074431A discloses a method for regulating terminating circuits, e.g. impedances, in a network, which requires a complex transceiver technology for sending and receiving.

SUMMARY

The teachings of the present disclosure may provide inexpensive arrangements and methods for optimizing the transmission of digital data in two-wire communication networks. For example, some embodiments may include a communication network (KNW1-KNW4) having two or more network nodes (NK1-NK12), wherein a network node (NK1-NK12) comprises: a receiver (EV), suitable for receiving signals at different data rates, wherein the receiver (EV) is designed to discern the signal quality of received signals; a transmission apparatus (SV), suitable for sending signals at different data rates; and a controllable terminating impedance (3). A network node (NK1-NK12) is designed to transmit the discerned signal quality to one or more network nodes. At least one network node (NK1-NK12) in the communication network (KNW1-KNW4) is designed to record the discerned signal qualities and the values of the terminating impedances (3) of the respective network nodes (NK1-NK12). At least one network node (NK1-NK12) prescribes for the further network nodes in the communication network (KNW1-KNW4) what respective value they need to set as a terminating impedance (3). At least one network node (NK1-NK12) comprises means for determining what terminating impedances (3) the network nodes (NK1-NK12) are intended to set in each case in order to optimize the data rate between the network nodes (NK1-NK12) and the signal quality at the receivers (EV) of the network nodes (NK1-NK12).

Some embodiments may include a network node in a communication network (KNW1-KNW4) having at least two network nodes (NK1-NK12) and two-wire connections. The network node (NK1-NK12) comprises: a receiver (EV), suitable for receiving signals at different data rates, wherein the receiver (EV) is designed to discern the signal quality of received signals; a transmission apparatus (SV), suitable for sending signals at different data rates; a controllable terminating impedance (3); a measuring unit (MM) for discerning the signal quality measurable at the receiver; a memory (M) for recording the values of the terminating impedances (3) and the reception quality, associable with a respective value, for the network nodes (NK1-NK12) in the communication network (KNW1-KNW4); a control unit (SM) for prescribing a setting value for the terminating impedances (3) of the network nodes (NK1-NK12); and an evaluation and computation unit (AM) for prescribing respective setting values for the terminating impedances (3) of the network nodes (NK1-NK12) in order to attain an optimum data rate in the communication network (KNW1-KNW4), wherein the evaluation and computation are effected based on different data rates.

In some embodiments, the communication network (KNW1-KNW4) has a free topology.

In some embodiments, the data transmission in the communication network (KNW1-KNW4) is effected by means of baseband modulation.

In some embodiments, the data encoding in the communication network (KNW1-KNW4) is effected by means of Manchester encoding.

In some embodiments, the terminating impedances (3) of the network nodes (NK1-NK12) are chosen on the basis of the topology of the communication network (KNW1-KNW4) and/or of the transmission method and/or of the cable length and/or of the characteristic impedance.

In some embodiments, the network nodes (NK1-NK12) are supplyable with power via the communication network (KNW1-KNW4).

In some embodiments, a network node (NK1-NK12) is designed to supply one or more other network nodes (NK1-NK12) in the communication network (KNW1-KNW4) with power.

In some embodiments, at least one network node (NK1-NK12) is designed to take the reception quality of the network nodes (NK1-NK12) as a basis for ascertaining the maximum possible data transmission rate in the communication network (KNW1-KNW4).

In some embodiments, at least one network node (NK1-NK12) is designed to set up a connection to one or more further communication networks (KNW1-KNW4).

Some embodiments include methods for optimizing the transmission of digital data in a two-wire communication network (KNW1-KNW4), the method comprising the following steps:

step 1: analysis of the communication network (KNW1-KNW4), consisting of network nodes (NK1-NK12) having a respective connectable or disconnectable terminating impedance (3, AI) and two-wire lines for connecting the network nodes (NK1-NK12), wherein the reception quality for the network nodes (NK1-NK12) is determined by applying an initial data rate for each network node (NK1-NK12), when a defined setup for the terminating impedances is used.

Step 2: by using the initial data rate for each network node (NK1-NK12), determining whether the respective terminating impedance (3) needs to be connected or disconnected in order to increase the respective reception quality of a network node (NK1-NK12).

Step 3: analysis of the communication network (KNW1-KNW4), wherein the reception quality for the network nodes (NK1-NK12) is determined by applying a second data rate for each network node (NK1-NK12).

Step 4: by using the second data rate for each network node (NK1-NK12), determining whether the respective terminating impedance (3) needs to be connected or disconnected in order to increase the reception quality.

Repetition of steps 3 and 4 until there is no measurable improvement in the reception quality.

In some embodiments, during operation it is identified whether a new network node (NK1-NK12) is connected in the communication network (KNW1-KNW4) or an existing network node (NK1-NK12) is disconnected or whether a new connection is connected or whether an existing connection is removed.

In some embodiments, following the identification of an alteration the communication network (KNW1-KNW4) is reoptimized for reception quality and/or data rate.

In some embodiments, in steps 3 and 4, the second data rate is determined from the initial data rate by increasing the data rate in steps.

In some embodiments, the initial data rate used is 50 kbit/s.

In some embodiments, in steps 3 and 4 the second data rate is determined from the initial data rate by reducing the data rate in steps.

In some embodiments, the initial data rate used is 1 Mbit/s.

In some embodiments, in step 1 all terminating impedances are either disconnected or connected.

In some embodiments, the value of the terminating impedance matches the characteristic impedance of the network.

In some embodiments, the value of the terminating impedance (3) is in the region of 100 ohms.

In some embodiments, the value of the terminating impedance (3) is variable.

In some embodiments, the determination of what terminating impedances (3) need to be connected and disconnected in order to increase the reception quality is effected using a mathematical optimization method.

In some embodiments, the method is applied to each network node (NK1-NK12).

In some embodiments, the method starts based on empirical connection and disconnection of terminating impedances (3) for determined network nodes (NK1-NK12) that is dependent on the topology of the communication network (KNW1-KNW4).

In some embodiments, the method takes place in parallel with the data mode.

BRIEF DESCRIPTION OF THE DRAWINGS

The teachings of the present disclosure and example embodiments are explained using the example of the figures below, in which:

FIG. 1 shows a first exemplary communication network for building automation,

FIG. 2 shows the frequency response of an exemplary channel in the communication network of FIG. 1, FIG. 5 shows a block diagram of a first exemplary network node, FIG. 6 shows a block diagram of a second exemplary network node, FIG. 7 shows an exemplary flowchart for the performance, FIG. 8 shows an exemplary flowchart for a disconnection algorithm for terminating impedances, FIG. 9 shows an exemplary flowchart for a connection algorithm for terminating impedances, FIG. 10 shows an exemplary measurement table with terminal resistances.

DETAILED DESCRIPTION

Figure 3:
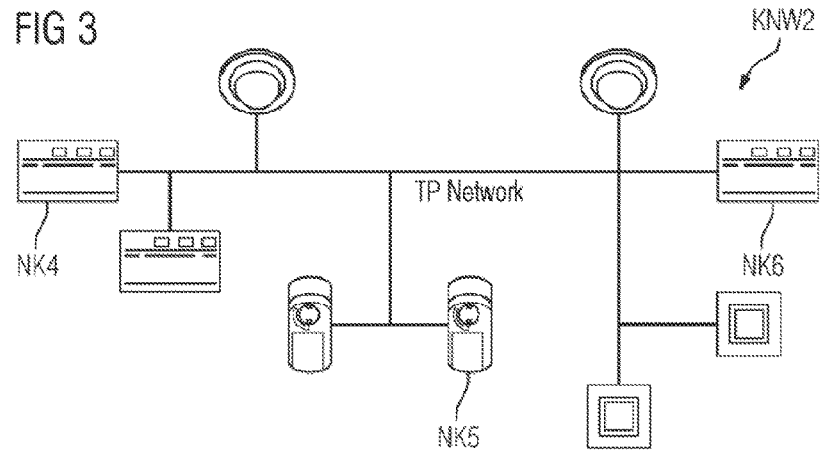
FIG. 3 shows a second exemplary communication network for building automation.

Various embodiments many include a communication network having two or more network nodes, wherein a network node comprises:

a receiver, suitable for receiving signals at different data rates, wherein the receiver is designed to discern the signal quality of received signals;

a transmission apparatus, suitable for sending signals at different data rates;

a controllable terminating impedance; wherein a network node is designed to transmit the discerned signal quality to one or more network nodes; wherein at least one network node in the communication network is designed to record the discerned signal qualities and the values of the terminating impedances of the respective network nodes; wherein at least one network node prescribes for the further network nodes in the communication network what respective value they need to set as a terminating impedance; and wherein at least one network node comprises means for determining what terminating impedances the network nodes are intended to set in each case in order to optimize the data rate between the network nodes and the signal quality at the receivers of the network nodes. Such communication networks provide a high data transmission rate and are suitable particularly for the new Internet protocols (e.g. IPv6) without the need for additional repeaters or amplifiers to be used. In addition, the communication network allows continuity e.g. from the control level (e.g. operation and observation) down to field level (e.g. to the sensors).

In some embodiments, the determination of the signal quality is effected by evaluating the multiple sampling of the (digital) received signal. In addition, the signal quality can be determined e.g. using the signal-to-noise ratio. In some embodiments, the controllable terminating impedance is designed to terminate the end of the line with a suitable impedance or to leave it open.

Some embodiments may include a network node in a communication network having at least two network nodes and two-wire connections, wherein the network node comprises:
- a receiver, suitable for receiving signals at different data rates, wherein the receiver is designed to discern the signal quality of received signals;
- a transmission apparatus, suitable for sending signals at different data rates;
- a controllable terminating impedance;
- a measuring unit (microchip) for discerning the signal quality measurable at the receiver;
- a memory for recording the values of the terminating impedances and the reception quality, associable with a respective value, for the network nodes in the communication network;
- a control unit for prescribing a setting value for the terminating impedances to the network nodes; and
- an evaluation and computation unit for prescribing respective setting values for the terminating impedances of the network nodes to attain an optimum data rate in the communication network, wherein the evaluation and computation are effected based on different data rates.

In building automation, the network nodes may represent controllers, actuators, and/or sensors. As such, a very high level of data traffic arises in the communication network e.g. in the case of firmware updates. Communication networks according to the teachings of the present disclosure may allow a particularly high level of data traffic in the network without having to accept losses in the latency. In some embodiments, the values of the terminating impedances of all network nodes are recorded.

In some embodiments, the communication network has a free topology. It is possible to choose any topology (bus, tree, etc.) for the communication network in a flexible manner. It is also possible for multiple communication networks having any topologies to be connected via routers.

In some embodiments, the data transmission in the communication network is effected by means of baseband modulation. Data transmission by means of baseband modulation is widespread particularly in the case of digital transmission systems, the entire width of the transmission channel being utilizable in the signal.

In some embodiments, the data encoding in the communication network is effected by means of Manchester encoding. The Manchester code is self-synchronizing, regardless of the DC voltage level, and a clock signal can be regenerated precisely at the receiver end, i.e. the clock signal is derivable from the code itself.

In some embodiments, the terminating impedances of the network nodes are chosen on the basis of the topology of the communication network and/or of the transmission method and/or the cable length and/or the characteristic impedance. For example, the terminating impedances may be chosen automatically, based on an algorithm. The values of the terminating impedances of the network nodes are therefore stipulated in a dedicated manner for the underlying infrastructure of the communication network. In some embodiments, the value of the terminating impedance is derived from the characteristic impedance of the cable.

In some embodiments, the network nodes are supplyable with power via the communication network. This reduces particularly the wiring complexity, since no separate lines need to be laid for the power supply to the subscribers (i.e. the network nodes).

In some embodiments, a network node is designed to supply one or more other network nodes in the communication network with power. As a result, the communication network can easily be extended by further subscribers without cabling complexity for the power supply.

In some embodiments, at least one network node is designed to take the reception quality of the network nodes as a basis for ascertaining the maximum possible data transmission rate in the communication network. The method according to the invention for optimizing the transmission of digital data in a communication network can therefore be performed using the infrastructure that is already present in the network anyway, without an additional device or without additionally generated measurement signals.

In some embodiments, at least one network node is designed to set up a connection to one or more further communication networks. Since a network node has router properties, the method according to the invention for optimizing the transmission of digital data can be performed over multiple connected communication networks.

Some embodiments may include methods for optimizing the transmission of digital data in a two-wire communication network, the method comprising the following steps:
- step 1: analysis of the communication network, consisting of network nodes having a respective connectable or disconnectable terminating impedance and two-wire lines for connecting the network nodes, wherein the reception quality for the network nodes is determined by applying an initial data rate for each network node, when a defined setup (initial configuration) for the terminating impedances is used;
- step 2: by using the initial data rate for each network node, determining whether the respective terminating impedance needs to be connected or disconnected in order to increase the respective reception quality of a network node;
- step 3: analysis of the communication network, wherein the reception quality for the network nodes is determined by applying a second data rate for each network node;
- step 4: by using the second data rate for each network node, determining whether the respective terminating impedance needs to be connected or disconnected in order to increase the reception quality;
- repetition of steps 3 and 4 until there is no measurable improvement in the reception quality.

When a node without terminating impedances becomes undesirably noticeable as a result of reflections, such as when the data rate from this node to other nodes is noticeably reduced, the deliberate setting of terminal resistances in the communication network improves the data rate, with connected terminating impedances increasing the signal attenuation and being removed when the terminating impedance of an adjacent node adequately eliminates the reflections. In some embodiments, the reception quality of the received signals from all other network nodes is evaluated per network node. In some embodiments, the controllable terminating impedance is designed to terminate the end of the line with a suitable impedance or to leave it open.

In some embodiments, during operation it is identified whether a new network node is connected in the communication network or an existing network node is disconnected or whether a new connection is connected or whether an existing connection is removed. As a result, it is possible to react to alterations in the communication network quickly and flexibly.

In some embodiments, following the identification of an alteration the communication network is reoptimized for reception quality and/or data rate. This ensures that, in the event of a change in the communication network, optimum data transmission in the communication network is subsequently achieved again.

In some embodiments, in steps 3 and 4, the second data rate is determined from the initial data rate by increasing the data rate in steps. This iteratively achieves an optimum data rate in the communication network in incremental steps. Incremental increases in the data rate in steps can be implemented easily.

In some embodiments, the initial data rate used is 50 kbit/s. With an initial data rate of 50 kbit/s as the starting point for incremental increases in the data rate in steps, an optimum data rate is quickly achieved in the communication network. In some embodiments, a preceding test ascertains the initial setup (i.e. the initial configuration) of the terminating impedances.

In some embodiments, in steps 3 and 4 the second data rate is determined from the initial data rate by reducing the data rate in steps. Decremental reductions in the data rate in steps can also be implemented easily.

In some embodiments, the initial data rate used is 1 Mbit/s. On the basis of an initial data rate of 1 Mbit/s as the starting point for a decremental reduction in the data rate in steps, an optimum data rate is quickly achieved in the communication network.

In some embodiments, in step 1 all terminating impedances are either disconnected or connected. As a result, a first reception quality for the network nodes can be determined very simply and quickly as a reference quality.

In some embodiments, the value of the terminating impedance matches the characteristic impedance of the network. It is therefore possible for the respective optimum data transmission rate for each network topology that is respectively present to be achieved in a dedicated and efficient manner.

In some embodiments, the value of the terminating impedance is in the region of 100 ohms. A value of 100 ohms or in the region around 100 ohms (±10%) as a terminating impedance has been found to be advantageous particularly for twisted pair lines.

In some embodiments, the value of the terminating impedance is variable. As a result, the value of the terminating impedance can be geared to the respective infrastructure and topology of the communication network in a dedicated manner to achieve a respective optimum data rate.

In some embodiments, the determination of what terminating impedances need to be connected and disconnected in order to increase the reception quality is effected using a mathematical optimization method (e.g. linear optimization). Using a mathematical optimization method to decide what terminating impedances need to be connected and disconnected to increase the reception quality increases the efficiency of the method, in particular.

In some embodiments, the method is applied to each network node. This achieves an optimum data transmission rate for the entire communication network.

In some embodiments, the method starts based on empirical connection and disconnection of terminating impedances for determined network nodes that is dependent on the topology of the communication network. In this way, given a known wiring plan for the communication network, a setting can be found that advantageously has the least attenuation and reduced reflections for the desired maximum data rate. On the basis of this setting, the method very efficiently achieves an optimum data transmission rate for the communication network. It is advantageous to terminate e.g. spur lines after a certain length. Spur lines are lines that branch off from a signal path.

In some embodiments, the method takes place in parallel with the data mode. This allows operation of the communication system during optimization.

In building automation, networks are in use as complex tree-like structures having multiple nodes, many terminals and line sections of unequal length. The cables used are rarely of genuine twisted pair type with correspondingly low damping per meter, but rather are often only conventional star-quad cables with minimal twisting of the cores. The frequency response of these cables shows a distinct and high increase in the damping per meter with frequency. In addition, length-dependent distortions can arise. This limits the maximum data rate. Signals (frequently DC-free line codings, e.g. Manchester encoding) that, depending on the bit sequence, have spectral components with the main focus on the data rate and substantial components up to twice the data rate suffer severe amplitude fluctuations over the course of time as a result.

FIG. 1 shows a first exemplary communication network KNW1 for building automation. For reasons of clarity, only single network nodes in the communication network KNW1 are provided with reference symbols NK1-NK3. In FIG. 1, the numerals 1 to 15 identify connection points, branch points, and end points in the communication network KNW1 by way of example. Each of the connection points, branch points, and end points may have one or more network nodes NK1 to NK3 connected to it.

In the tree-like communication network KNW1 shown in FIG. 1, the signals from a transmitter are reflected at each end point, provided that the line is not provided with a fitting terminating impedance (typical value 100 ohms) at the end. In such network configurations, the frequency response, particularly of two-wire lines, shows a distinct increase in the damping on the basis of the line lengths and the frequency. If the individual ends of the branches are not terminated with the characteristic impedance of the line, reflections arise that migrate to other network nodes and thus distort the signal by addition. If all ends are terminated, the damping increases further, since the transmitter (ultimately each node) is loaded to an ever greater degree. The damping and the distortions result in a decrease in the signal level and hence in the transmission quality in the communication network.

If, in contrast to the point-to-point connections customary in most cases in communications engineering (e.g. Ethernet, TV coaxial cable), many terminals are subscribers in such a communication network KNW1, then the connection of a terminating impedance to each end point results in a very low total impedance for the communication network KNW1 and hence in enormously high damping of the signals. The transmitter would need to feed a very high power to the low-impedance network KNW1.

In such communication networks KNW1, signals with distortions and additionally a multiplicity of delayed signal copies reflected from other network ends thus arise at the receiver of each terminal. This becomes serious particularly when a reflected signal having frequency content at the data rate is overlaid with a delay on the signal component that is actually to be received at frequencies at twice the data rate. As the former signal is attenuated less at low frequency, it masks the actual second signal to a certain extent. The greater the delay (along with the longer the individual branches) of the communication network KNW1, the more critical the situation becomes. This is known from intersymbol interference theory and has an exasperated effect in this case depending on the bit sequence. An upper data rate is provided by the network KNW1 in the case of simple receiver architectures. This limit is today approximately 10 kbit/s for networks having lengths of up to 1000 m.

FIG. 2 shows the frequency response of an exemplary channel in the communication network of FIG. 1, with the transmitter at port 4 (NK2) and the receiver at port 12 (NK3). In the graph of FIG. 2, the frequency in MHz is plotted on the axis of abscissa and the respective amplitude or the level (in dB) therefor is plotted on the axis of ordinates.

In digital data transmission, intersymbol interference (ISI) describes interference between symbols sent at successive times. This can also be shown in the frequency domain or frequency response. Besides the aforementioned damping that increases with frequency, the delayed signal added to the direct signal results in a null in the frequency response on the basis of the lengths of the spur lines that the network KNW1 has. The null is approximately the frequency $f=c/4L$, where c is the speed of propagation on the cable and L is the length of the responsible spur line to the causative port. In the depiction shown in FIG. 2, the dip at 700 kHz can probably be attributed to the reflected signal on the spur line to port 10 in FIG. 1. Spur lines are lines that branch off from a signal path. The signal path may in this case be the connection between any two nodes (e.g. NK2 and NK3) in the network KNW1.

In particular, the new Internet protocols (e.g. IPv6) and techniques give rise to the desire for direct continuity of the communication networks as far as the sensor or actuator in building automation too. To this end, the increase in the data rate by a factor of 10 would be extremely useful, however, since these protocols bring along substantially more overhead and new applications (e.g. Firmware download) require more data throughput. In addition, the network lengths are not expected to become shorter and the number of terminals (e.g. sensors) is not expected to become smaller. No additional repeaters or amplifiers should to be used for reasons of cost.

To optimize the transmission of digital data in a two-wire communication network, the teachings of the present disclosure can be used for different topologies of networks and for networks with different types of network nodes (e.g. controllers, sensors, actuators, fire alarms, lighting).

FIG. 3 shows a second exemplary communication network KNW2 as a standalone two-wire network (e.g. twisted pair) for building automation. In the depiction shown in FIG. 3, only three network nodes (NK4-NK6) are depicted for reasons of clarity. The exemplary communication network KNW2 may be e.g. a KNX system.

Figure 4:
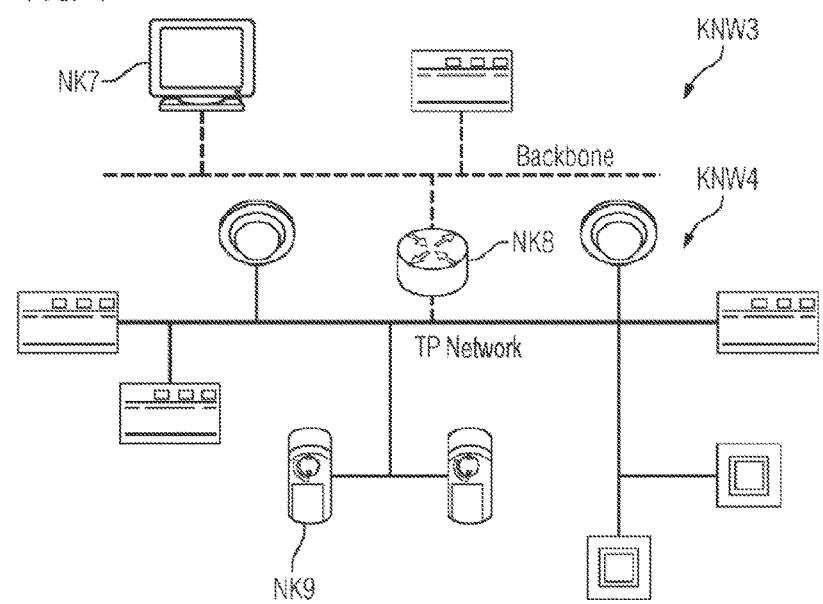
FIG. 4 shows two exemplary communication networks that are coupled to one another via a router.

FIG. 4 shows two exemplary communication networks KNW3 and KNW4 that are coupled to one another via a router NK8. In FIG. 4, an exemplary two-wire network KNW3 is coupled to the backbone network KNW4 by a router NK8. In the depiction shown in FIG. 4 too, only three network nodes (NK7-NK9) are depicted for reasons of clarity.

FIG. 5 shows a block diagram of a first exemplary network node NK10. The network node NK10 is connected to a communication network comprising two-wire connections (e.g., twisted pair connecting cables) via a suitable interface SS1 (network port). The exemplary network node NK10 comprises:

- a receiver EV, suitable for receiving signals at different data rates, wherein the receiver EV is designed to discern the signal quality of signals received via the interface SS1;
- a transmission apparatus SV, suitable for sending signals at different data rates via the interface SS1;
- a controllable terminating impedance AI;
- a measuring unit or a measuring means MM for discerning the signal quality measurable at the receiver EV;
- a memory M for recording the values of the terminating impedances and the reception quality, associable with a respective value, for the network nodes in the communication network;
- a control unit SM for prescribing a setting value for the terminating impedances of the network nodes; and
- an evaluation and computation unit AM for prescribing respective setting values for the terminating impedances of the network nodes to attain an optimum data rate in the communication network, wherein the evaluation and computation are effected based on different data rates. The in-coupling and out-coupling of voltage is effected by a suitable coupling element K1, and the in-coupling and out-coupling of data is effected by a suitable coupling element K2.

In some embodiments, the control unit SM, the measuring unit MM, the evaluation and computation unit AM, and the memory means M are integrated in a processing unit MP (e.g. a microprocessor) and implemented using suitable hardware and software means.

The connectable and disconnectable terminating impedance AI can be actuated by the microprocessor MP directly. In some embodiments, the connectable and disconnectable terminating impedance AI may also be integrated in the coupling element K2.

FIG. 6 shows a block diagram of a second exemplary network node NK11. The exemplary network node NK11 may comprise a router, suitable for coupling two communication networks that may have different topologies, protocols, and/or transmission methods. The communication networks are couplable to the router via applicable network ports SS2 and SS3. The exemplary network node NK11 can have only router functionality in this case, or the network node NK11 may be in the form of a normal subscriber (e.g. sensor, actuator) and in this case additionally comprise router functionality.

FIG. 7 shows an exemplary flowchart for optimizing the transmission of digital data in a two-wire communication network. In some embodiments, following installation but before useful operation of the communication network, under the control of a network node distinguished as a master, test data are transmitted from each network node and received by each of the other network nodes each time and checked for transmission errors. This process can now be performed for different combinations (in principle also for all) of connected terminating impedances. The terminating impedances are electronically connectable and disconnectable in an individually addressed manner by a command from the master. This process is moreover performed during initial setting of the terminating impedances for each data rate. The master can thereby ascertain the maximum data rate for the entire network and between the individual nodes and can ascertain the terminating impedances to be set. After this process, the conditions in the communication network remain constant until a change is made to the communication network, such as e.g. the addition of nodes, removal of nodes, alteration of cabling. Only in this case does the process need to be repeated.

There are at least three possibilities for the starting point of this auto-setting process:
1) All terminations are disconnected. The source resistance is always present in each transmitter.
2) All terminations are connected. The source resistance is always present in the transmitter.
3) The terminations found using the empirically theoretical method are set. The source resistance is always present in the transmitter.

The first and second possibilities do not ensure that all nodes are available (too much reflection and too much attenuation). The third possibility provides availability, at least for low data rates, but there are possibly further improvements (see Further Options section). In the simplest case, all combinations of termination settings would now be tried. This would result in 2N tests (where N is the number of nodes), which quickly becomes immeasurably large for the test time of approximately 10 s per test. Therefore, algorithms have been sought that have a test time that increases only linearly with N.

When a node without a terminating impedance becomes undesirably noticeable as a result of reflections, e.g., the data rate to other nodes is noticeably reduced, this cannot be remedied better than by setting the terminating impedance for this node. From this concept, two processes (algorithms) have been developed and their effectiveness demonstrated by tests. These are the "Remove RLoad" algorithm, which first sets all terminations and then begins disconnection, and the "Add RLoad" algorithm, which has no terminations other than the source resistance and begins with connection.

The "Remove RLoad" algorithm (disconnection algorithm, see FIG. 8) may be faster and set out from a gentler initial configuration, since it has terminated the spur lines from the outset. However, when there are many nodes connected, the damping can become very great, which means certain nodes could become unavailable.

The "Add RLoad" algorithm (connection algorithm, see FIG. 9) has no active terminating impedances in the initial configuration, which results in an initial configuration that tends to be less favorable. The frequency dips may mean that individual nodes cannot be reached. Because the terminating impedances are activated, more and more nodes become available, however.

If manual initial configuration is not prescribed in the communication network, it is possible to use an automated "channel setup", as depicted by way of example in FIG. 7. In this case, an inventory or inventory recording (recording of available nodes) is first performed to see which nodes are present in the network. Thereafter, all terminating impedances are activated and an inventory is performed again. If all nodes are still available, then the "Remove RLoad" algorithm (disconnection algorithm) can be used. Otherwise, the "Add RLoad" algorithm (connection algorithm) is better suited, since there is less damping on the transmission channels. In some embodiments, the number of nodes is known to the master so that it knows when it can communicate with all nodes, but this not imperative.

FIG. 8 shows an exemplary flowchart for a disconnection algorithm ("Remove RLoad") for terminating impedances. To start the disconnection algorithm ("Remove RLoad"), the terminating resistance of all nodes need to be activated in advance. The algorithm then involves one terminating impedance after the other being deactivated and a speed test being performed in each case (e.g. over all network nodes). If the deactivation of the terminating impedance means that a spur line is no longer terminated and has a negative influence on the network, then some nodes will no longer be able to communicate at the same high data rate. This means that the network becomes worse overall and the terminating impedance is activated again. If no worsening is discernible, the terminating impedance remains deactivated. This is done until all terminating impedances have been checked or just one terminating impedance is now activated. The configuration is also ended when all nodes can communicate with every one at the maximum data rate, e.g. an adequate number of the terminating impedances are activated.

In some embodiments, with every iteration, an inventory is performed. This allows nodes to be identified that become available on account of the lower damping as a result of the deactivation of a terminating impedance. The newly identified nodes require the terminating impedance to be activated so that the algorithm can check whether these nodes require the terminating impedance to be set. Sometimes, the terminating impedance of the new node can make a terminating impedance that has not been removed previously superfluous. For this reason, the previously checked terminating impedances should be checked once again if the terminating impedance needs to be set for the newly found node.

This algorithm normally requires N+2 iterations, which means that a channel setup (channel configuration) for 64 nodes would take approximately 10 min, since a speed test takes approximately 10 s. The speed test is the element of an iteration that requires the most time (N is the number of network nodes in this case).

Spur lines are lines that branch off from a signal path. In this case, the signal path may be the connection between any two nodes (e.g. A and B) in a network.

FIG. 9 shows an exemplary flowchart for a connection algorithm ("Add RLoad") for terminating impedances in a communication network. Before the connection algorithm ("Add RLoad") is started, the initial setup is determined. This can involve an existing configuration (e.g. manual or predetermined by empirical rules) being undertaken or, at the outside, the terminating impedance for a master being (automatically) set. In this case, a master can control its own terminating impedance intelligently itself. If there are multiple potential masters in the network, these network nodes can negotiate or split the master.

Subsequently, one terminating impedance after the other is activated and a speed test is performed in each case. If the activation of the terminating impedance makes the communication network worse overall, the terminating impedance is deactivated again. This is done until all terminating impedances have been checked. Since, depending on the topology of the network, multiple terminating impedances may be used to achieve an improvement, terminating impedances are kept active until they worsen the network.

The configuration is also ended when all nodes can communicate with every one at the maximum data rate. In addition, with each iteration, an inventory (recording of the available nodes) is also performed to identify nodes that are newly available. Newly identified nodes must deactivate the terminating impedance. The algorithm also checks for these nodes whether the terminating impedance needs to be set. Restarting the algorithm is not needed, since these nodes will again not be available in the starting configuration.

When all terminating impedances have been checked, the disconnection algorithm ("Remove RLoad") (see FIG. 8) is used to check whether all added terminating impedances are necessary. This is needed to remove superfluous terminating impedances and hence to have less damping on the channel. Superfluous terminating impedances can arise when a terminating impedance is activated and this results in an improvement in the network, but another terminating impedance that is checked later accomplishes this improvement better. This is the case e.g. on a bus topology when the terminating impedance at the end of the bus line is not checked first.

This algorithm requires a maximum of 2*N+2 iterations, which means that a channel setup for 64 nodes would take approximately 20 min, since a speed test takes approximately 10 s. The speed test is the element of an iteration that requires most time. N is the number of network nodes.

Hence, not all possible configurations (2^N) need to be tested, but rather it is only necessary for each terminated impedance to be switched on and off independently. N is the number of nodes in the network (including the master). The "Remove RLoad" algorithm requires no more than N iterations, since each impedance is deactivated once. The "Add RLoad" algorithm could have up to 2*N iterations, since a terminating impedance is first activated and, if deemed useful, is deactivated again. This means that the complexity rises linearly with the number of nodes.

Each iteration requires an inventory, a speed test and configuration of the network. All of these elements also increase linearly with the number of nodes. This applies particularly to the speed test, since a measurement produces N measurement results. This is achieved by virtue of all nodes simultaneously evaluating the measurement packet of the sending node.

It is also possible to start useful mode prior to completion of channel setup (channel configuration) as soon as all nodes are able to communicate with every one at the lowest data rate. Thereafter, channel setup can be ended during useful mode. To this end, useful data are transmitted and speed tests performed e.g. alternately. This slows down the two processes or actions, but allows the system, i.e. the communication network, to be started up earlier.

Order of the Nodes to be Tested

The order in which the terminating impedances are tested has a significant influence on the final configuration. Tests have shown that any order allows a good configuration to be found. However, it has also been found that an intelligent order allows the configuration to be improved more quickly and more reliably.

At the beginning of a channel setup, a speed test is always performed using the initial configuration. The speed test can also be used to judge the reception quality of the individual network nodes. The better other nodes are received, or the higher the data rates on which the test packets are received, the better the reception quality. During the channel setup, a new speed test is performed with every iteration, which means that the reception quality is also judged afresh after every iteration.

In the case of the connection algorithm ("Add RLoad", see FIG. 9), in which no terminating impedances are activated in the initial configuration, the nodes having the best reception qualities tend not to be affected by the spur lines, or they tend themselves to be the causes of frequency-selective dips. If these nodes are now checked first, then the network is improved more quickly and more reliably.

In the case of the disconnection algorithm ("Remove RLoad", see FIG. 8), in which all terminating impedances are activated in the initial configuration, the nodes having the best reception quality tend to be nodes that are in the center of the network.

These are the nodes for which the terminating impedance tends not to be needed, since they are not on a long spur line. On account of the damping, the reception quality for nodes that are connected to long spur lines is poorer. This means that the nodes having the best reception quality need to be checked first in this case too.

In addition, nodes that are located very close together can be identified by correlation of the reception quality of the individual communication links. If two nodes can communicate with the same nodes at the same maximum data rate, there is a high probability of these nodes being located close together. Hence, in a first round for adjacent nodes, only one may be checked, which tends to lead to only one of the nodes connected to the same spur line being checked and then a further spur line being checked more quickly.

Combination with Empirically Theoretical Methods

Particularly with a known wiring plan for the communication network, a combination with empirically theoretical methods is possible. Since the dips in the frequency response are at a frequency that is inversely proportional to the line length and the frequency range is given by the data rate <1 MHz, it is possible for rules to be empirically set up concerning where terminations should be fitted.

The following rules allow frequency-selective dips of <1 MHz to be avoided in a network:

every network requires there to be at least 1 terminating impedance, and this may also be the source resistance of the transmitter.

Any spur line >40 m must be terminated.

No terminating impedance can be inserted at junctions.

With a bus or branch as a spur line, only the longest signal path needs to be terminated, provided that its total length exceeds 40 m.

So that spur lines cause no dips in the frequency range <1 MHz (up to 500 kbit/s Manchester-encoded data rate), all points that are further than 40 m away from the nearest junction must be terminated. This means that no reflections can arise that would result in dips of <1 MHz.

For 1 Mbit/s, it would be necessary to terminate lines of more than 20 m. If the spur line consists of a bus or branch (spur line having multiple junctions of >40 m), then it suffices to terminate the longest path. Even in the case of small networks, there needs to be at least one terminating impedance so that multiple reflections do not arise that in turn lead to frequency-selective dips. The source resistance (series resistance) of the transmitter can sometimes also serve as a terminating impedance. A junction appears of its own accord to have a low impedance, which means that the insertion of an additional terminating resistor at the junction leads to an even lower impedance, i.e. to poorer matching, and should therefore be omitted.

Speed Test Progression

The speed test may be started from the master and has the following progression:

| Command from the master | Action by the nodes | Reaction by the nodes |
| --- | --- | --- |
| Start speed test | Initialize internal measurement table, send acknowledge to the master | — |
| Send test packet 50 kbps | Send test packet at 50 kbps | Store reception quality of the received test packets |
| Send test packet 100 kbps | Send test packet at 100 kbps | Store reception quality of the received test packets |
| Send test packet 250 kbps | Send test packet at 250 kbps | Store reception quality of the received test packets |

| Command from the master | Action by the nodes | Reaction by the nodes |
|---|---|---|
| Send test packet 500 kbps | Send test packet at 500 kbps | Store reception quality of the received test packets |
| Send test packet 1000 kbps | Send test packet at 1000 kbps | Store reception quality of the received test packets |
| End speed test | Send measurement table to the master | — |

The "Start Speedtest" command is used by each node to initialize its respective internal measurement table. With each "Send Test Packet" command, each node sends a test packet at the relevant data rate and the other nodes store the reception quality of the received test packet in their measurement table. With the "End Speedtest" command, the speed test is ended and the measurement tables are sent to the master.

The measurement table that each node carries contains, by way of example, N*S fields of a few bytes each. In this case, N is the number of nodes in the network and S is the number of speed tests that are performed. Each field stores the reception quality, also called LQI (Link Quality Indication), of the respective node at the respective data rate.

The progression of the speed test can also be changed by the master to check only single or perhaps other data rates. In some embodiments, a timeslot method (e.g. TDMA) is used for the speed test.

In some embodiments, the method is controlled by a node referred to as a master. The master used can be any network node that comprises applicable processing means (e.g. a microprocessor with appropriate software) and memory means (e.g. flash memory). In some embodiments, the initial position of the terminating resistances or terminating impedances following installation of the nodes is chosen as follows according to the chosen algorithm:

1) all terminations are disconnected. The source resistance is always present for the transmitter.
2) All terminations are connected. The source resistance is always present for the transmitter.
3) The terminations found using the empirically theoretical method are set. The source resistance is always present for the transmitter.

Accordingly, as described in FIG. 7, the master first performs an inventory (recording of the available nodes in the communication network) at the lowest data rate to receive a response from as many nodes as possible. The master then commands these nodes to connect their terminating impedance. A fresh inventory should now make all nodes visible. The master now executes one of the two algorithms, Add RLoad (connection algorithm, see FIG. 9) or remove RLoad (disconnection algorithm, see FIG. 8), with the master transmitting to the nodes whether they need to connect or disconnect their terminating impedance.

For each positional variant, a speed test is performed at gradually higher data rates. This involves short data packets with synchronization information and parameters, such as a TDMA timeslot and data rate to be used, for example, being sent to each node. Each node then uses its timeslot to send a data block with a pseudo noise sequence. Each non-sending node can receive this data block and check it for correctness and reception quality. Each node then fills in a table with the results of all received data blocks that it has obtained from other nodes. As soon as all data rates have been checked, the master collects all of these tables and assembles the complete set to form a matrix (see FIG. 10, upper section). Depending on whether the speed in the network turns out to be higher than in the preceding step, the most recently connected terminating impedance is left or not left in its position and the speed reached is added or not added. Every iteration requires an inventory, a speed test and configuration of the network.

This is repeated for each positional variant of the terminating impedances RLoad. When all iteration steps have been performed in accordance with the methods shown in FIG. 8 and FIG. 9, the master finally makes a decision about the data rate to be used. This can either correspond to the lowest common rate that was still possible for all nodes without error, or the nodes can use the speed ascertained for this connection individually, according to their addressees, for a packet that is to be transmitted.

In some embodiments, only as many terminating impedances as are necessary to ensure communication between all nodes in the network are set. The method always attempts to find the optimum.

FIG. 10 shows an exemplary measurement table with terminating impedances. The measurement table is stored and managed in the memory of at least one network node, advantageously in the respective master. By way of example, the measurement table shown in FIG. 10 is a global measurement table that comprises all network nodes.

Figure 11:
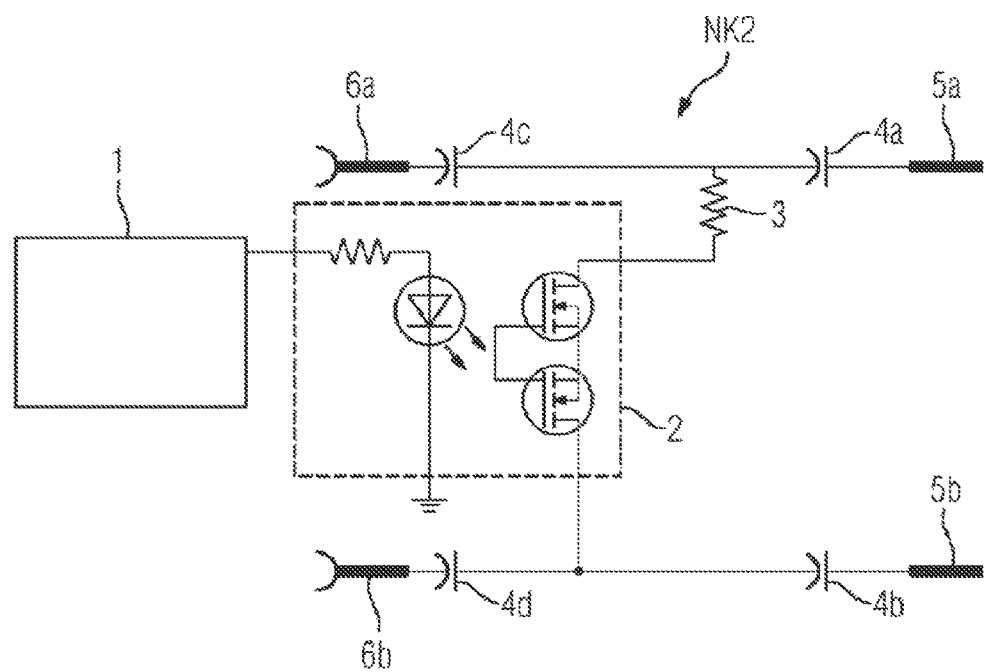
FIG. 11 shows a block diagram for a third exemplary network node.

FIG. 11 shows a block diagram of the detail from a third exemplary network node NK12 that is used for connecting and disconnecting the optimum terminating impedance using the methods described above.

Structure of the Exemplary Network Node NK12

A connectable and disconnectable resistor 3 terminates the transmission line connected to the terminals 5a, 5b that leads to the node. By way of example, the impedance used in FIG. 11 is a nonreactive resistance.

The microprocessor 1 at the node NK12 can command the connection and disconnection by a logic signal under program control. This logic signal controls a zero-potential solid state relay 2 consisting of an LED and two NMOS FETs with a photosensitive gate. In the switched-on state, the resistor 3 is connected between the cable cores by the relay 2, and the line is therefore terminated with the value of resistor 2. At the line impedance of 100 ohms, the value of resistor 3 is 100 ohms. In practice, the FETs of the switch 2 have a non-zero forward resistance in the switched-on state, which means that the value of resistor 3 is embodied with a reduction by this proportion. The capacitors 4a, 4b, 4c, 4d are used for isolating the DC voltage components at the terminals 5a, 5b for the balanced transmission line and at the terminals 6a, 6b for the receiver.

REFERENCE SYMBOLS

KNW1-KNW4 Communication network
NK1-NK12 Network node
1, MP Microprocessor
2 Relay
3 Resistor
4a-4d Capacitor
5a, 5b Terminals
6a, 6b Terminals
SS1-SS3 Interface
M Memory
AM Evaluation means
MM Measuring means
SM Control means V Power supply
SV Transmission apparatus
EV Receiver
K1, K2 Coupling elements
AI Terminating impedance

What is claimed is:

1. A communication network with two or more network nodes wherein each network node comprises:
   a receiver receiving signals at different data rates, wherein the receiver discerns the signal quality of received signals;
   a transmission apparatus sending signals at different data rates; and
   a controllable terminating impedance;
   wherein a network node transmits the discerned signal quality to one or more additional network nodes;
   at least one network node records the discerned signal qualities and corresponding values of the terminating impedances of the respective network nodes;
   at least one network node prescribes for the additional network nodes a new respective value to set as a terminating impedance; and
   at least one network node comprises means for determining new terminating impedance values to optimize the data rate between the various network nodes and the signal quality at each of the network nodes in response to empirical connection or disconnection of terminating impedances for determined network nodes based at least in part on a topology of the communication network.

2. A network node in a communication network with two-wire connections between network nodes, the network node comprising:
   a receiver receiving signals at different data rates;
   a transmission apparatus sending signals at different data rates;
   a controllable terminating impedance;
   a measuring unit discerning the signal quality measurable at the receiver;
   a memory recording values of the terminating impedances for received signals and a corresponding reception quality associated with the respective value for each additional network node in the communication network;
   a control unit prescribing a setting value for the terminating impedances of the additional network nodes; and
   an evaluation and computation unit prescribing respective setting values for the terminating impedances of the additional network nodes to attain an optimum data rate in the communication network, wherein the evaluation and computation are effected based on different data rates in response to empirical connection or disconnection of terminating impedances for determined network nodes based at least in part on a topology of the communication network.

3. The communication network as claimed in claim 1, wherein the communication network includes a free topology.

4. The communication network as claimed in claim 1, wherein the data transmission in the communication network comprises baseband modulation.

5. The communication network as claimed in claim 1, wherein the data encoding in the communication network comprises Manchester encoding.

6. The communication network as claimed in claim 1, wherein the terminating impedances of the network nodes are chosen on the basis of one or more of: the topology of the communication network, the transmission method, the cable length, and the characteristic impedance.

7. The communication network as claimed in claim 1, wherein the network nodes are supplied with power via the communication network.

8. The communication network as claimed in claim 1, wherein a network node supplies one or more additional network nodes in the communication network with power.

9. The communication network as claimed in claim 1, wherein at least one network node uses the reception quality of the network nodes as a basis for ascertaining the maximum possible data transmission rate in the communication network.

10. The communication network as claimed in claim 1, wherein at least one network node sets up a connection to one or more further communication networks.

11. A method for optimizing the transmission of digital data in a two-wire communication network, the method comprising:
    sensing empirical connection or disconnection of terminating impedances for determined network nodes dependent on a topology of the communication network;
    in response to sensing an empirical connection or disconnection, analyzing the communication network including network nodes having a respective adjustable terminating impedance and two-wire lines connecting the network nodes, including determining a reception quality for the respective network nodes by applying an initial data rate for each network node with a defined setup for the terminating impedances;
    determining whether to adjust the respective terminating impedances by using the initial data rate for each network node to increase the respective reception quality of a network node;
    applying a second data rate for each network node to determine a second reception quality for the network nodes;
    determining whether the respective terminating impedance should be connected or disconnected to increase the reception quality using the second data rate for each network node; and
    repeating the application of an additional data rate and determination of the reception quality until there is no measurable improvement in the reception quality.

12. The method as claimed in claim 11, further comprising identifying whether a new network node is connected to the communication network or an existing network node is disconnected.

13. The method as claimed in claim 12, further comprising reoptimizing the impedances following identification of an alteration to the communication network, to improve reception quality and/or data rate.

14. The method as claimed in claim 11, further comprising determining the second data rate from the initial data rate by increasing the data rate in steps.

15. The method as claimed in claim 11, wherein the initial data rate used is 50 kbit/s.

16. The method as claimed in claim 11, wherein the second data rate is determined from the initial data rate by reducing the data rate in steps.

17. The method as claimed in claim 11, wherein the initial data rate used is 1 Mbit/s.

18. The method as claimed in claim 11, wherein the defined setup includes all terminating impedances either disconnected or all connected.

19. The method as claimed in claim 11, wherein the value of the terminating impedance matches the characteristic impedance of the network.

20. The method as claimed in claim 11, wherein the value of the terminating impedance is approximately 100 ohms.

* * * * *